United States Patent Office  3,849,381
Patented Nov. 19, 1974

3,849,381
CHROMATE CURABLE SEALANT
COMPOSITIONS
Richard C. Doss and Leo L. Gingerich, Bartlesville, Okla.,
assignors to Phillips Petroleum Company
No Drawing. Filed Dec. 15, 1972, Ser. No. 315,511
Int. Cl. C08g 39/08, 43/00
U.S. Cl. 260—75 S          7 Claims

ABSTRACT OF THE DISCLOSURE

Compositions comprising a poly(oxyalkylene)-polyester-poly(monosulfide)-polythiol having an average of more than 2 mercapto groups per molecule and a chromate are curable to sealant or coating compositions. The poly(oxyalkylene)polyester - poly(monosulfide) - polythiols comprise the reaction product of (a) a mercaptoalkanoic acid, (b) a thiodialkanoic acid and (c) a poly(oxyalkylene)polyol.

---

This invention relates to curable poly(oxyalkylene)-polyester - poly(monosulfide) - polythiols. In accordance with another aspect, poly(oxyalkylene)-polyester-poly(monosulfide)-polythiol polymers containing on average more than 2 pendent thiol groups per molecule are cured with a chromate to produce a composition useful as a sealant or coating. In accordance with another aspect, poly(oxyalkylene) - polyester - poly(monosulfide) - polythiol polymers formed by the reaction of mercaptoalkanoic and thiodialkanoic acids and a poly(oxyalkylene)-polyol are curable to sealant compositions exhibiting greater toughness and better aging resistance than like formulations with a different curing agent. In accordance with a further aspect, poly(oxyalkylene) - polyester - poly(monosulfide)-polythiol polymers formed, as defined herein, are oxidatively coupled or cured in sealant formulations under either acid or neutral conditions with a chromate curing agent to form compositions useful as sealants.

It is known that radicals and molecules having thiol functionality can be bonded to similar groups and other molecules, usually by oxidative coupling or curing. Because of this characteristic, polythiols have found application as sealants, coatings, caulking compounds and polythiols are expensive, inconvenient and as a result undesirable in such applications.

Accordingly, it is an object of this invention to provide sealants based on poly(oxyalkylene)-polyester-poly(monosulfide)-polythiols having desirable properties.

It is another object of this invention to provide curing agents for poly(oxyalkylene)-polyester-poly(monosulfide)-polythiol polymers to form useful sealant compositions.

Another object of this invention is to provide poly(oxyalkylene)-polyester-poly(monosulfide) - polythiols which are curable to sealants having improved properties.

Another object of this invention is to provide cured sealant compositions having improved elongation and tensile break properties.

Other aspects, objects and the several advantages of this invention will be apparent to those skilled in the art from a study of this disclosure and the appended claims.

In accordance with the invention, a poly(oxyalkylene)-polyester-poly(monosulfide)-polythiol having an average of more than 2 mercapto groups per molecule is cured with a chromate, preferably in a sealant or coating formulation, to produce a composition useful as a sealant or coating.

Further in accordance with the invention, it has been found that chromates as defined herein effect good curing of a poly(oxyalkylene)-polyester-poly(monosulfide)-polythiol under acid conditions as well as under substantially neutral conditions. Thus, neutralization of acid catalyst or unreacted carboxylic acids employed in the preparation of the poly(oxyalkylene) - polyester - poly(monosulfide)-polythiols is not required prior to use of the polythiol product in the invention.

As is demonstrated in the specific working examples, formulations cured with chromates as defined herein exhibit greater toughness and better aging resistance as compared with like formulations cured with lead dioxide. It has also been observed that lead dioxide, for example, will not cure satisfactorily at normal ambient temperatures in a formulation comprising a poly(oxyalkylene)-polyester-poly(monosulfide)-polythiol which has a relatively high acid number.

The poly(oxyalkylene) - polyester - poly(monosulfide)-polythiols having an average of more than two mercaptan groups per molecule can be produced by reacting at least one mercaptoalkanoic acid and at least one thiodialkanoic acid with poly(oxyalkylene)-polyols having an average of more than two hydroxy groups per molecule.

The mercaptoalkanoic acids which can be used to prepare the poly(oxyalkylene)-polyester-poly(monosulfide)-polythiols can be represented by the formula $$HS(CR_2)_nCOOH,$$

wherein each R is hydrogen or an alkyl radical having 1 to about 5 carbon atoms, with a total of not more than about 10 carbon atoms in all R groups per molecule; and wherein $n$ is an integer in the range of 1 to about 5. Examples of some mercaptoalkanoic acids which can be employed include mercaptoacetic acid, 3-mercaptopropionic acid, 2 - mercaptopropionic acid, 4 - mercaptobutyric acid, 3 - isopropyl - 5 - mercaptovaleric acid, 2-ethyl-3-tert-butyl - 5 - mercaptovaleric acid, 2-propyl - 3 - mercaptoheptanoic acid, 3-pentyl - 6 - mercaptoundecanoic acid, and the like, and mixtures thereof.

The thiodialkanoic acids which can be employed in the production of the poly(oxyalkylene) - polyester - poly(monosulfide)-polythiols can be represented by the formula $HOOC(CR_2)_nS(CR_2)_nCOOH$, wherein R and $n$ are as defined above, with a total of not more than about 20 carbon atoms in all R groups per molecule. Examples of suitable thiodialkanoic acids which can be used include thiodiacetic acid, 3,3' - thiodipropionic acid, 2,2' - thiodipropionic acid, 2,3' - thiodipropionic acid, 4,4' - thiodibutyric acid, 5,5' - thiobis(3 - isopropylvaleric acid), 5,5'-thiobis(2 - ethyl - 3 - tert-butylvaleric acid), 3,3'-thiobis-(2 - propylheptanoic acid), 6,6' - thiobis(3 - pentylundecanoic acid), 4 - (carboxymethylthio)valeric acid, and the like, and mixtures thereof.

A particularly preferred procedure for reacting the mercaptoalkanoic acids and thiodialkanoic acids with the poly(oxyalkylene)-polyols is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acids with thiodialkanoic acids. The presently preferred procedure for preparing such mixtures of mercaptoalkanoic and thiodialkanoic acids is by hydrolyzing a mixture of mercapto nitriles and thiodinitriles which can be produced from alkanenitriles and hydrogen sulfide according to processes known to the art such as that described in U.S. 3,280,163. For example, according to a presently preferred procedure, acrylonitrile can be reacted with hydrogen sulfide in the presence of sulfur and a weak organic base to form a mixture consisting largely of 3-mercaptopropionitrile and 3,3'-thiodipropionitrile, containing minor amounts of other nitriles, which mixture can be subsequently hydrolyzed, without the necessity of separation, to form a suitable mixture of largely 3-mercaptopropionic acid and 3,3'-thiodipropionic acid, together with minor amounts of other carboxylic acids. Representative examples of nitriles that can be used are set forth in U.S. 3,280,163.

The poly(oxyalkylene)-polyols used in the preparation of the poly(oxyalkylene) - polyester - poly(monosulfide)-polythiols employed in this invention have an average of more than 2, preferably at least 2.5, hydroxy groups per molecule and molecular weights of from about 200 to about 20,000. These substances can be produced by the reaction of one or more epoxy-substituted hydrocarbons having the general formula

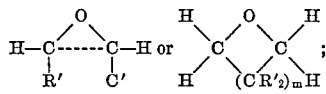

wherein each R' is hydrogen or an alkyl radical, the total number of carbon atoms per molecule being within the range of 2 to about 20, and $m$ is an integer of from 1 to about 10, preferably 1 to 3, with a polyol having the formula $Y(OH)_x$, wherein Y is a hydrocarbon radical having at least 2, preferably 3 to about 40, carbon atoms, and a valence equal to the value of $x$, $x$ is an integer of at least 2 and preferably 3 to about 12, and the number of carbon atoms per molecule of $Y(OH)_x$ is equal to or greater than $x$. Preferably Y is a saturated aliphatic, saturated cycloaliphatic, or aromatic radical, or combination thereof, bonded to at least 3 hydroxy groups. Examples of some polyols which can be used include ethylene glycol, glycerol, 1,3-propanediol, 2-butene-1,4-diol, erythritol, pentaerythritol, tris(hydroxymethyl)methane, 3-(hydroxymethyl)-1,5-pentanediol, 1,2,6-hexanetriol, 2-methyl-1,2,4,6,8,10-decanehexol, 1,2,4,6,7,9,12,14,15,17,19,20-eicosanedodecol, 1,2,40-tetracontanetriol, 4-cyclohexene-1,2-diol, 1,4-cyclohexanediol, 1,5,9 - cyclododecanetriol, 1,2,3,4-cyclopentanetetrol, 2-methyl-1,3,5 - cyclooctanetriol, 4-(1,2 - dihydroxyethyl)cyclohexanol, resorcinol, phloroglucinol, 2,4,6-trihydroxytoluene, $\alpha,\alpha$ - bis(p - hydroxyphenyl)benzyl alcohol, 1,4,5,8-naphthalenetetrol, and the like, and mixtures thereof. Examples of some epoxy-substituted hydrocarbons which can be used in the preparation of the poly(oxyalkylene)-polyols include 1,2-epoxyethane, 1,2-epoxypropane, 1,3-epoxypropane, 1,4-epoxybutane, 1,5-epoxypentane, 3-methyl-1,8-epoxyoctane, 4-octyl-1,12-epoxydodecane, 3-ethyl-5-isopropyl-1,10-epoxydecane, 2-butyl-1,6-epoxyhexane, 3-decyl-1,5-epoxypentane, 2-heptadecyl-1,3-epoxypropane, 1,2-epoxybutane, 2-methyl-3,4-epoxyheptane, 1,2-epoxyoctane, 2,3-epoxydodecane, 4-ethyl-1,2-epoxytetradecane, 1,2-epoxyeicosane, and the like, and mixtures thereof.

The poly(oxyalkylene)-polyols can be prepared by contacting at least one polyol of the formula $Y(OH)_x$, as defined above, with an epoxy-substituted hydrocarbon, as defined above, under suitable polymerization conditions, as is known to the art. For instance, glycerol or 1,2,6-hexanetriol can be contacted with an excess of propylene oxide (1,2-epoxypropane) under elevated pressure and in the presence of suitable polymerization promoters. Products of this type can be obtained from commercial sources. In the preparation of poly(oxyalkylene)-polyols having an average of more than 2 hydroxy groups per molecule, mixtures of the above polyols such as at least one diol and another polyol of higher functionality can be reacted with the epoxy-substituted hydrocarbons defined above to form poly(oxyalkylene)-polyols having an average of more than two hydroxy groups per molecule. For instance, a mixture of 1,4-butanediol and 1,2,6-hexanetriol can be reacted with ethylene oxide to produce a poly(oxyethylene)-polyol having an average of more than two hydroxy groups per molecule. Alternatively, a poly(oxyalkylene)-polyol produced, e.g., by the reaction of a diol such as ethylene glycol with an alkylene oxide such as propylene oxide can be mixed with another poly(oxyalkylene)-polyol produced, e.g., by the reaction of a triol such as 1,2,6-hexanetriol with an alkylene oxide such as propylene oxide.

The mixtures of mercaptoalkanoic acids and thiodialkanoic acids can be reacted with the poly(oxyalkylene)-polyols to form poly(oxyalkylene)-polyester-poly(monosulfide) - polythiols by an esterification reaction which can be effected in any suitable equipment at temperatures preferably in the range of about 50 to about 250° C. Preferably the reaction is conducted in the presence of diluents that are substantially completely inert to the reactants and products under the reaction conditions employed. Such diluents can comprise as much as 95 weight percent of the components charged to the reactor. Acid esterification catalysts such as p-toluenesulfonic acid, benzenesulfonic acid, sulfuric acid, and the like can also be employed, if desired, to accelerate the rate of reaction. In that event, the diluents employed also should be inert to the acid catalyst. Examples of suitable diluents include toluene, benzene, xylene, cyclohexane, heptane, and the like, and mixtures thereof. The reaction pressure should be sufficient to prevent excessive loss of reactants and/or solvent at operating temperatures. Satisfactory pressures are normally within the range of about 0.5 to about 10 atmospheres. It is normally desirable to provide a means of removing water of reaction during the course of the esterification. This function can be accomplished by means known to the art, e.g., by azeotropic distillation. The properties of the poly(oxyalkylene) - polyester - poly(monosulfide)-polythiols will vary somewhat depending upon the reactants employed, the ratios of the various reactants, and other reaction liquid short-chain polymers, the chain length depending to considerable extent on the ratio of thiodialkanoic acid to mercaptoalkanoic acid used. In general, higher ratios of thiodialkanoic acid to mercaptoalkanoic acid yield longer polymer chains and a more viscous liquid or near solid product.

The esterification reaction should be effected to such an extent that at least about 80 percent of the hydroxy groups of the poly(oxyalkylene)-polyol are reacted with carboxy groups of the mercaptoalkanoic acid or thiodialkanoic acid to form ester groups. In general, in the range of about 0.8 to about 1.2 equivalents of hydroxy groups of the poly(oxyalkylene)-polyol should be employed for each equivalent of carboxy groups of the mercaptoalkanoic acid and thiodialkanoic acid. In general, an average of more than 2, preferably at least 2.5, ester groups are formed for each molecule of poly(oxyalkylene) - polyester - poly(monosulfide)-polythiol product can be neutralized prior to addition of the chromate curing agent. Suitable neutralization agents include ammonium hydroxide, calcium hydroxide, and the like.

The chromate curing agent can be an ammonium or alkali metal monochromate, dichromate, trichromate, or tetrachromate. Examples of some suitable chromates include ammonium chromate, ammonium dichromate, lithium chromate, sodium chromate, sodium dichromate, sodium trichromate, potassium chromate, potassium dichromate, potassium tetrachromate, rubidium dichromate, cesium chromate, and the like, and mixtures thereof. The preferred chromates are the chromates of sodium, sodium chromate and especially sodium dichromate being the presently preferred chromates. In addition to the advantages noted above, sodium dichromate has been shown to effect faster gelling of the poly(oxyalkylene)-polyester-poly(monosulfide)-polythiol formulation than does lead dioxide, thereby providing sooner a tack-free composition.

Although the amount of chromate curing agent can vary over a considerable range, the chromate should be added in an amount at least sufficient to achieve conversion of at least about 70 percent of the mercaptan groups present. Normally about 0.5 to about 5, preferably about 1 to about 3, parts by weight chromate should be used per 100 parts by weight poly(oxyalkyllene)-polyester-poly(monosulfide)-polythiol. The polythiol employed can be substantially free of acid catalyst used in its preparation and/or of carboxy groups, or it can have a relatively high acid number, e.g., up to about 50 mg. KOH/g. sample or higher, but preferably it has an acid number less than about 10 mg. KOH/g. sample. The curing temperature can vary over a wide range but generally will be within the range of about 0 to about 100° C., preferably within the range of about 20 to about 50° C. The curing time can vary over a wide range, depending in part on the curing temperature, but generally will be within the range of about 1 minute to about 3 weeks, preferably within the range of about 1 hour to about 2 weeks.

Materials that can be employed together with the poly(oxyalkylene)-polyester-poly(monosulfide)-polythiol and the chromate curing agent in sealant and coating formulations include any material conventionally used as a non-elastomeric component of sealant and coating formulations, e.g., fillers, modifiers, pigments, plasticizers, extenders, stabilizers, adhesion promoters, and the like such as calcium carbonate, titanium dioxide, silica, iron oxide, carbon black, dibutyl phthalate, chlorinated hydrocarbons, sulfur, alumina, zirconia, polyethylene, polystyrene, partially hydrolyzed gamma-glycidoxypropyltrimethoxysilane, 2,2' - methylenebis(4-methyl-6-tert-butylphenol), water, and the like.

The amount of poly(oxyalkylene)-polyester-poly(monosulfide)-polythiol present in the sealant or coating fomulations containing non-elastomeric components will vary appreciably depending upon the desired final characteristics of the sealant or coating composition. However, in general, the amount of poly(oxyalkylene)-polyester-poly(monosulfide)-polythiol present in the sealant or coating formulation, excluding curing agent, will range from about 25 to 100 percent by weight, preferably being within the range of about 40 to about 80 percent by weight. The remainder, if any, can comprise non-elastomeric components in varying proportions depending upon the characteristics of the poly(oxyalkylene)-polyester-poly(monosulfide)-polythiol and the final composition desired.

The poly(oxyalkylene) - polyester-poly(monosulfide)-polythiol, the chromate curing agent, and any other non-elastomeric components employed in the sealant or coating formulations can be blended together simultaneously and suitably agitated, e.g., by hand-mixing or machine-blending, or the chromate curing agent, with or without other non-elastomeric components, can be added to the poly(oxyalkylene) - polyester - poly(monosulfide)-polythiol previously blended with other components normally used in a sealant or coating formulation. The particular technique for blending the ingredients will depend in part upon available equipment and the requirements of the sealant or coating application problem.

The sealants and coatings of this invention can be employed to join or coat various substrates. For example, substrates such as wood, plastics, glass, stone such as granite, marble, or the like, concrete or metal such as aluminum, steel, iron, zinc, or the like can be joined or coated.

Example I

A mixture consisting largely of 3-mercaptopropionitrile and 3,3'-thiodipropionitrile, with minor amounts of other components, was prepared in the following manner. A mixture of 17.1 pounds sulfur and 1140 pounds hydrogen sulfide was heated to 122° F. (50° C.)/450 p.s.i.g. in a 500-gallon stirred reactor. A solution of 890 pounds acrylonitrile containing 8.5 pounds 2-methyl-5-ethylpyridine was pumped slowly into the bottom of the reactor over a period of several hours, the reactor temperature being maintained at 122–126° F. (50–52° C.). As the reaction proceeded, the pressure dropped below 300 p.s.i.g. After the addition of the acrylonitrile and 2-methyl-5-ethylpyridine, the reaction mixture was stirred for about 7 hours at 122° F. (50° C.) to ensure completion of the reaction. Unreacted hydrogen sulfide was flared off, and 9 pounds of p-toluenesulfonic acid monohydrate was added as a stabilizer. Gas chromatographic analysis of the resulting product showed it to have the following composition.

| Component: | Weight percent |
|---|---|
| Lights | 0.5 |
| 3-Mercaptopropionitrile | 73.6 |
| 2,3'-Thiodipropionitrile | 1.5 |
| 3,3'-Thiodipropionitrile | 20.0 |
| 3,3'-Dithiodipropionitrile | 3.8 |
| Unknown | 0.6 |

Example II

A portion of the product described in Example I was hydrolyzed to the corresponding acids. To 100 pounds of the above mixture of nitriles at 150° F. (66° C.) in a 100-gallon glass-lined stirred reactor was added slowly within a period of 1 hour 179 pounds of concentrated hydrochloric acid, resulting in a slight exotherm. The reaction temperature was then maintained at 190–210° F. (88–99° C.) for 3 hours after the acid addition was complete. Water and hydrochloric acid were removed at 210° F. (99° C.) at a pressure of less than 50 mm. Hg. After addition of 649 pounds of xylene, the residual mixture was heated to 212° F. (100° C.). Both heating and stirring were then stopped, at which time ammonium chloride by-product settled. Analysis of a sample of the hot supernatant xylene solution indicated it contained 9.45 weight percent 3-mercaptopropionic acid and 5.10 weight percent dicarboxylic acids, calculated as thiodipropionic acid and comprising largely 3,3'-thiodipropionic acid with minor amounts of 2,3'-thiodipropionic acid and 3,3'-dithiodipropionic acid. The hot slurry was then filtered through a pre-coated Sparkler filter, and the filtrate was passed into a 1000-gallon glass-lined stirred reactor. The residue was washed with 644 pounds of xylene, and the washings were combined with the filtrate in the 1000-gallon reactor. Analysis of the resulting xylene solution indicated it contained 5.61 weight percent 3-mercaptopropionic acid and 3.14 weight percent of the dicarboxylic acids shown above, calculated as above. Thus, the xylene solution contained about 104 pounds of the mixture of carboxylic acids.

Example III

The above mixture of carboxylic acids was esterified with Niax LHT–34 poly(oxyalkylene)polyol (derived from 1,2,6-hexanetriol and propylene oxide, and having an equivalent weight of 1690 and a hydroxyl number of 33.2). To the 1000-gallon reactor containing the above 104 pounds of the mixture of carboxylic acids and 1087 pounds of xylene was added 1690 pounds of Niax LHT–34 poly(oxyalkylene)-polyol, 15 pounds of p-toluenesulfonic acid monohydrate, and 2366 pounds of xylene. The ratio of hydroxy groups in the poly(oxyalkylene)-polyol to carboxy groups in the mixture of acids was about 0.90:1. As the reaction mixture was stirred and heated, a slow stream of nitrogen was passed from the bottom of the reactor through the liquid mixture and out through the condensing system. This nitrogen stream facilitated water removal during the esterification reaction and served to protect the poly(oxyalkylene)-polyol and mercaptan groups from oxidation and/or thermal degradation. An induction tube was used to periodically sample the reaction mixture to determine the extent of esterification by means of carboxylic acid and mercaptan analyses. A modified Dean-Stark sight-glass was provided to remove water, azeotroped with xylene, as it formed. Water began to azeotrope at 215° F. (102° C.). The pot temperature was gradually increased to a maximum of 280° F. (138° C.) at the end of 48 hours. After the esterification was complete, as determined by the leveling off of the carboxylic acid content, the reaction mixture was cooled to about 70° F. (21° C.), and approximately 15 gallons, herein designated as mixture A, of the mixture was separated for use in Example V, after which 100 pounds of calcium hydroxide slurried in 100 gallons of xylene was added as a neutralizing agent to the remaining, major portion of the reaction mixture. The mixture was stirred 4 hours and filtered through a pre-coated Sparkler filter. The filtrate was heated to a maximum of 200° F. (93° C.)/20 mm. Hg, with about 6 cubic feet (standard conditions)/minute nitrogen bubbling through the liquid phase to enhance removal of xylene. Approximately 1500 pounds of poly(oxyalkylene) - polyester-poly(monosulfide)-polythiol having an average of more than two mercaptan groups per molecule was obtained as a thick amber viscous liquid remaining in the pot. This liquid product, which was stored under a blanket of nitrogen, had a mercaptan sulfur content of 0.96 weight percent, an acid number (mg. KOH/g. sample) of 0.19, a viscosity of 11,520 cps. at 25° C., and a volatile material content of 0.30 weight percent. The product was evaluated in a sealant formulation as described in Example IV.

Example IV

To 25 g. of the poly(oxyalkylene)-polyester-poly(monosulfide)-polythiol of Example III having an acid number of 0.19 was added 2.5 g. titanium dioxide, 12.5 g. calcium carbonate, 3.125 g. Clorafin 50 chlorinated paraffin wax containing 48–52 weight percent chlorine, 0.625 g. of a stock solution containing 2 weight percent elemental sulfur dissolved in Clorafin 50 chlorinated paraffin wax, 0.25 g. Cyanamid 2246 antioxidant [2,2'-methylenebis(4-methyl-6-tert-butylphenol)], 1.5 g. Cab-O-Sil fumed silica, 0.145 g. yellow pigment (Cadmium Yellow 1476 from Harshaw Chemical Co.), 0.185 g. carbon black (N765 from Phillips Petroleum Co.), and 0.635 g. iron oxide (R–2166 from Pfizer Minerals). After the above components had been hand-mixed for approximately 10 minutes, the resulting mixture was divided into two equal portions, herein designated as portion 1 and portion 2. To portion 1 was added 0.725 g. of a 1:1, by weight, mixture of lead dioxide and dibutyl phthalate, 0.125 g. partially hydrolyzed gamma-glycidoxypropyltrimethoxysilane (prepared from 2.36 parts by weight gamma-glycidoxypropyltrimethoxysilane and 0.36 part by weight water), and 0.287 g. water. These ingredients were hand-mixed for several minutes, and the resulting mixture was cast into a picture frame mold 2½ in. x 2½ in. x ⅛ in. The composition was then allowed to cure at ambient room temperature (about 25° C.) for 14 days. To portion 2 above was added 0.363 g. sodium dichromate dihydrate, 0.125 g. partially hydrolyzed gamma-glycidoxypropyltrimethoxysilane (prepared as described above), and 0.287 g. water. The resulting composition was hand-mixed, molded, and cured as described for portion 1. The cured sealant slabs obtained through use of lead dioxide or of sodium dichromate as the curing agent were removed from the frames and cut into sample specimens 2½ in. x ⅛ in. x ⅛ in., properties of which were determined by the method of ASTM D 638–56T. The results are shown in Table I.

TABLE I

|  | Curing agent used | |
| --- | --- | --- |
|  | Lead dioxide | Sodium dichromate |
| 50% modulus, p.s.i. | 87.2 | 136.5 |
| 100% modulus, p.s.i. | 127.1 | 212.8 |
| Tensile break, p.s.i. | 233.1 | 240.8 |
| Elongation, percent | 330 | 144 |

As shown in Table I use of sodium dichromate as the curing agent resulted in a much tougher product, as evidenced by the higher modulus values, than that obtained by use of lead dioxide. Furthermore, the product obtained by use of sodium dichromate as the curing agent had good tensile strength and elongation.

In additional investigations conducted on another formulation having the same composition as portions 1 and 2 above, mixed and allowed to stand at about 25° C. with the same curing agent, partially hydrolyzed silane, and water, each in the same concentration as employed above in this Example, it was found that use of sodium dichromate as the curing agent resulted in a tack-free sealant in less than 1 hour whereas use of lead dioxide as the curing agent did not result in a tack-free sealant until more than 12 hours had passed.

Example V

From mixture A, which was separated as shown in Example III from the major portion of the reaction mixture, xylene was removed by heating under reduced pressure, without neutralization of acid components. The residual poly(oxyalkylene) - polyester - poly(monosulfide) - polythiol having an average of more than two mercapto groups per molecule had a mercaptan sulfur content of 1.05 weight percent, an acid number (mg. KOH/g. sample) of 4.5, and a viscosity of 4246 cps. at 25° C. This product was admixed with the same ingredients in the same manner and in the same amounts as shown in Example IV for use with the poly(oxyalkylene)-polyester-poly(monosulfide)-polythiol employed therein. The cured sealant product obtained through the use of sodium dichromate was evaluated by the procedure used in Example IV. On the other hand, the mixture containing the lead dioxide did not undergo significant curing and therefore was not further evaluated. The results are shown in Table II.

TABLE II

|  | Curing agent used | |
| --- | --- | --- |
|  | Lead dioxide | Sodium dichromate |
| 50% modulus, p.s.i. | Not cured | 155.2 |
| 100% modulus, p.s.i. | do | 252.1 |
| Tensile break, p.s.i. | do | 290.3 |
| Elongation, percent | do | 130 |

Table II shows that whereas lead dioxide was not effective as a curing agent for the poly(oxyalkylene)-polyester-poly(monosulfide)-polythiol product having a relatively high acid number, use of sodium dichromate as the curing agent provided a cured product which was quite tough, as indicated by the high modulus values, and which had good tensile strength and elongation.

Example VI

The aging resistance was determined for sealant formulations containing a poly(oxyalkylene)-polyester-poly(monosulfide)-polythiol cured with lead dioxide or with sodium dichromate. This polymer, which had more than two mercapto groups per molecule, was prepared by esterification of Niax LHT-34 poly(oxyalkylene)-polyol with a mixture of carboxylic acids consisting primarily of 3-mercaptopropionic acid and 3,3'-thiodipropionic acid produced by hydrolysis of the corresponding nitriles which in turn were prepared by the reaction of hydrogen sulfide with acrylonitrile. The resulting poly(oxyalkylene)-polyester-poly(monosulfide)-polythiol had a mercaptan sulfur content of 1.05 weight percent, an acid number (mg. KOH/g. sample) of 0.65, and a viscosity of 6500 cps. at 25° C. A sealant formulation was prepared by mixing 500 g. of this polymer with 100 g. of titanium dioxide, 200 g. of calcium carbonate, 62.75 g. of Aroclor 6062 chlorinated polyphenyls (mixture of monochlorinated biphenyl and polychlorinated terphenyl from Monsanto), 12.5 g. of a solution consisting of 2 weight percent sulfur in Aroclor 6062, 5 g. of Cyanamid 2246 antioxidant [2,2' - methylenebis(4 - methyl - 6 - tert-butylphenol)], and 30 g. of Cab-O-Sil fumed silica. With 400 g. of the above sealant formulation was mixed 13.2 g. of a 1:1, by weight, mixture of lead dioxide in dibutyl phthalate, 4.8 g. of water, and 2.2 g. of polarity hydrolyzed gamma-glycidoxypropyltrimethoxysilane (prepared from 472 parts by weight gamma-glycidoxypropyltrimethoxysilane and 72 parts by weight water). With 182 g. of the sealant formulation was mixed 2.0 g. sodium dichromate dihydrate, 2.0 g. water, and 1.0 g. partially hydrolyzed gamma-glycidoxypropyltrimethoxysilane (prepared as above). The above mixtures containing lead dioxide or sodium dichromate as the curing agent were then cast into picture frame molds 2½ in. x 2½ in. x ⅛ in., and the compositions were allowed to cure at ambient room temperature (about 25° C.) for 14 days. The cured compositions were then removed from the frames and cut into sample specimens 2½ in. x ⅛ in. x ⅛ in., the sample specimens being cut with or without prior subjection to accelerated weathering tests. Tensile strength, elongation, and modulus of the specimens were determined by the method of ASTM D 638-56T. The accelerated weathering tests were conducted, using an Atlas Weather-Ometer, at a specimen temperature of 124° F. and a relative humidity of about 40 percent with ultraviolet light radiation and in an air atmosphere containing ozone in a concentration of 15 parts per hundred million parts air. The results of the evaluations are shown in Table III.

TABLE III

| Curing agent used | Hours in Weather-Ometer | Tensile break, p.s.i. | Elongation, percent | Modulus 50% | Modulus 100% | Remarks |
|---|---|---|---|---|---|---|
| Lead dioxide | 0 | 248.7 | 514 | 48.6 | 73 | No cracks, not sticky. |
| Do | 300 | 249.7 | 540 | 48.2 | 71 | Cracks, sticky. |
| Do | 647 | 224.3 | 600 | 36.4 | 52.9 | Bad cracks, sticky. |
| Do | 1,200 | 175.1 | 515 | 33.6 | 49.2 | Do. |
| Sodium dichromate | 0 | 342.1 | 231 | 102.6 | 164.3 | No cracks, not sticky. |
| Do | 300 | 341.6 | 336 | 88.5 | 136.5 | Do. |
| Do | 600 | 391.4 | 291 | 107.2 | 167.8 | Do. |
| Do | 1,200 | 330.5 | 335 | 74.0 | 116.8 | Slight cracks, not sticky. |

Table III shows that the sealant cured with sodium dichromate, as contrasted with that cured with lead dioxide, was tougher and stronger prior to the accelerated weathering tests and remained tougher and stronger throughout the weathering tests, as well as maintaining a better appearance after subjection to the tests.

We claim:

1. A composition curable to a sealant comprising (a) a poly(oxyalkylene) - polyester - poly(monosulfide)-polythiol having an average of more than two mercapto groups per molecule and (b) a chromate selected from the group consisting of ammonium and alkali metal monochromates, dichromates, trichromates and tetrachromates in an amount sufficient to convert at least about 70 percent of the pendent thiol groups to polysulfide groups and thus form a sealant, said (a) being the acidic, unneutralized polymeric reaction product of at least one mercaptoalkanoic acid, at least one thiodialkanoic acid, and at least one poly(oxyalkylene)-polyol having an average of more than two hydroxy groups per molecule.

2. A composition according to claim 1 wherein (a) is the acidic unneutralized polymeric reaction product of
   (1) a mercaptoalkanoic acid having the formula $HS(CR_2)_nCOOH$ wherein R is selected from the group consisting of hydrogen and alkyl radicals having from 1-5, inclusive, carbon atoms, the maximum number of carbon atoms in all R groups being 10, and n is an integer ranging from 1-5,
   (2) a thiodialkanoic acid having the formula $HOOC(CR_2)_nS(CR_2)_nCOOH$ wherein R is selected from the group consisting of 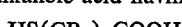
   number of carbon atoms in all R groups being 20, and (3) a poly(oxyalkylene)-polyol having at least three pendent hydroxy groups per molecule and a molecular weight in the range 200-20,000, the amount of (3) present being in the range 0.8-1.2 equivalents of pendent hydroxy groups for each equivalent of carboxylic groups of the mercaptoalkanoic and thiodialkanoic acids.

3. A composition according to claim 2 wherein (3) is the reaction product of
   (4) at least one epoxy hydrocarbon selected from the group consisting of

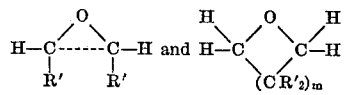

wherein R' is selected from the group consisting of hydrogen and alkyl radicals with the total number of carbon atoms per molecule ranging up to and including 20 carbon atoms, and m ranges from 1-10 with
   (5) a polyol of the formula

wherein Y is a hydrocarbon radical having from 3 to 40, inclusive, carbon atoms per radical and a valence equal to the value of x, and x is an integer in the range 3 to 12.

4. A composition according to claim 2 wherein
   (1) is 3-mercaptopropionic acid,
   (2) is comprised principally of 3,3'-thiodipropionic acid, and
   (3) is a poly(oxyalkylene)-polyol formed by reacting 1,2,6-hexane-triol and propylene oxide, and further wherein the amount of (1) employed ranges from 60 to 80 weight percent based upon the total of (1) and (2).

5. A composition according to claim 1 wherein said chromate is sodium dichromate.

6. A composition according to claim 2 further comprising a filler.

7. A composition according to claim 2 wherein there is present about 0.5 to about 5 parts by weight chromate per 100 parts by weight poly(oxyalkylene)-polyester-poly-(monosulfide)-polythiol.

References Cited

UNITED STATES PATENTS 3,717,617  2/1973  Marrs et al. _____ 260—75

OTHER REFERENCES

Beyssac, Surfaces 1971, 10(59), 30–33.
Averko et al., Kauch. Rezina 27(4), 11–14 (1968).

MELVIN GOLDSTEIN, Primary Examiner

U.S. Cl. X.R.

117—123 D, 124 E, 132 B; 161—187; 260—40 R

UNITED STATES PATENT OFFICE
CERTIFICATE OF CORRECTION

Patent No. 3,849,381            Dated: November 19, 1974

It is certified that error appears in the above-identified patent and that said Letters Patent are hereby corrected as shown below:

Column 9, lines 68-70, should read:

--- wherein R and n are as defined above, the maximum number of carbon atoms in all R groups being 20, and ---.

Column 10, lines 12-18, the righthand formula should be as follows:

---

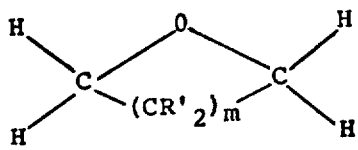

---.

Signed and sealed this 18th day of February 1975.

(SEAL)
Attest:

RUTH C. MASON
Attesting Officer

C. MARSHALL DANN
Commissioner of Patents
and Trademarks